United States Patent

[11] 3,597,091

| [72] | Inventor | John Kent Bowker<br>Marblehead, Mass. |
|---|---|---|
| [21] | Appl. No. | 698,821 |
| [22] | Filed | Jan. 18, 1968 |
| [45] | Patented | Aug. 3, 1971 |
| [73] | Assignee | Itek Corporation<br>Lexington, Mass. |

[54] INTERFEROMETER
22 Claims, 13 Drawing Figs.

| [52] | U.S. Cl. | 356/106,<br>356/156 |
|---|---|---|
| [51] | Int. Cl. | G01b 9/02 |
| [50] | Field of Search | 356/106–113 |

[56] References Cited
UNITED STATES PATENTS

| 3,409,375 | 11/1968 | Hubbard | 356/106 |
|---|---|---|---|
| 2,841,049 | 7/1958 | Scott | 356/106 |
| 2,527,338 | 10/1950 | Stamm | 356/106 |
| 2,151,631 | 3/1939 | Williams | 356/106 X |

*Primary Examiner*—Ronald L. Wibert
*Assistant Examiner*—Conrad Clark
*Attorneys*—Homer O. Blair, Robert L. Nathans, Lester S. Grodberg and David A. Rich ABSTRACT: An interferometer with a laser source focused on a pinhole produces monochromatic, coherent light with a spherical wave front. A beam splitter divides the light along light paths which are directed through coupling mirrors to the opposing parallel reflecting surfaces of a movable rigid body stage plate. Reflected energies returning along incident paths normal to the reflecting surfaces are directed back through the beam splitter to an exit pinhole where they are combined and interfere. A photoelectric detector produces an electrical signal in response to the variation of light intensity of the interfering energies. The number of intensity changes, corresponding to the number of interference fringes, is accumulated in a fringe counter which produces a measure of the linear translation of the stage plate with respect to a fiducial indicating a reference point at the optical center of the system, i.e. the center of the light paths. An embodiment is described and illustrated for measuring two coordinates, e.g. a two axes measurement system. In one form a servo system in response to the counts for each axis positions a movable member.

John Kent Bowker
INVENTOR.

BY David A. Rich
Attorney.

John Kent Bowker
INVENTOR.

BY David A. Rich
Attorney.

Patented Aug. 3, 1971 3,597,091

John Kent Bowker
INVENTOR.

BY
David A. Rich
Attorney.

Patented Aug. 3, 1971
3,597,091
11 Sheets-Sheet 7
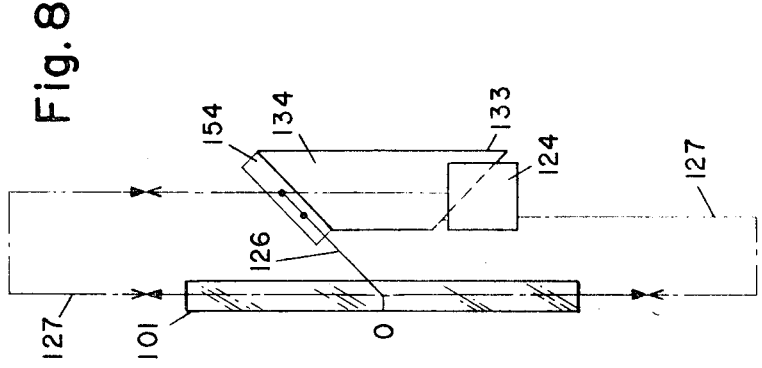
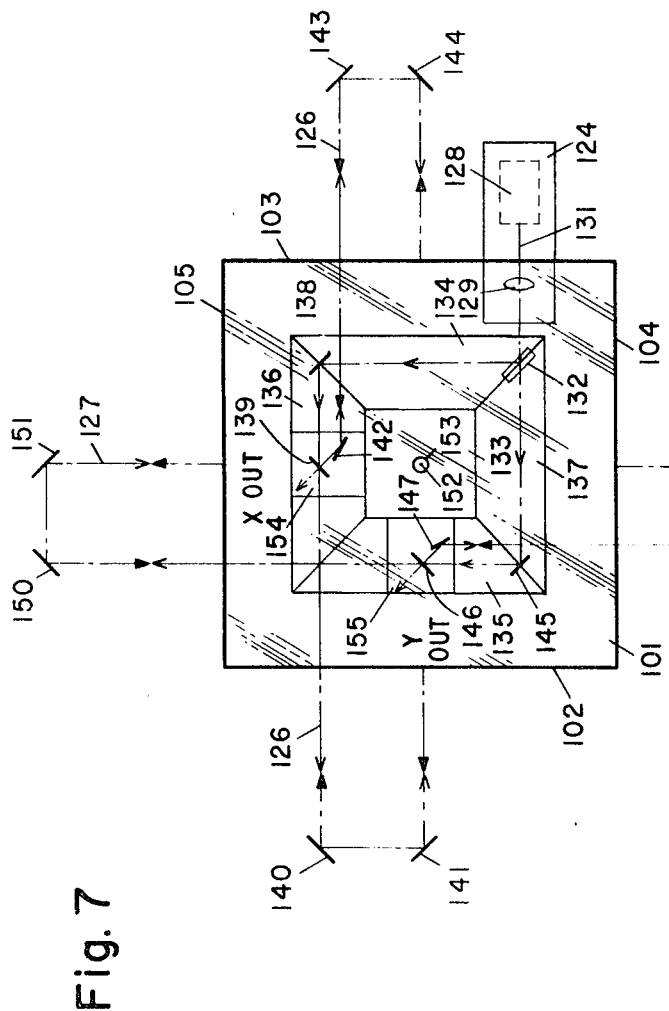
John Kent Bowker
INVENTOR.
BY
David A. Rich
Attorney.

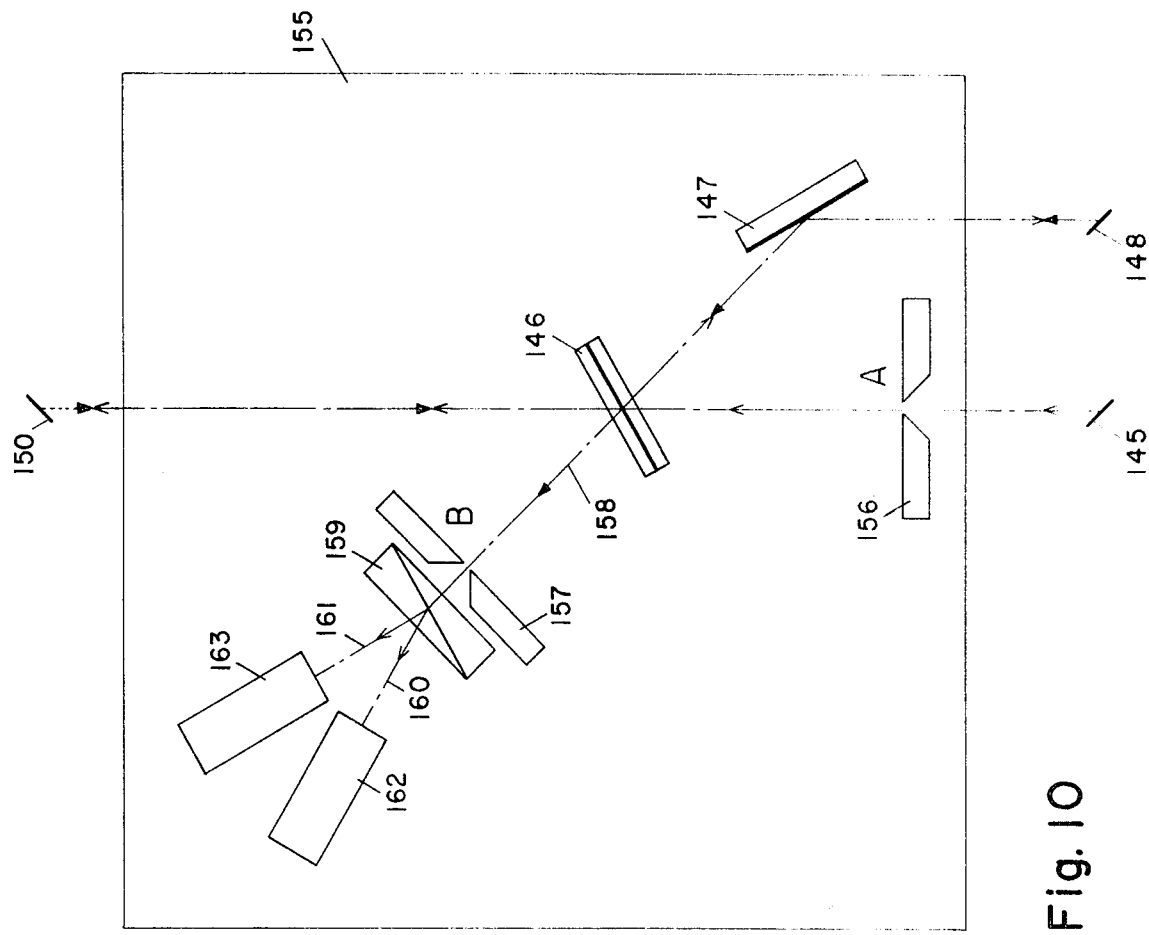

Patented Aug. 3, 1971

John Kent Bowker
INVENTOR.

BY
David A. Rich
Attorney.

Patented Aug. 3, 1971

John Kent Bowker
INVENTOR.

BY
David A. Rich
Attorney.

Patented Aug. 3, 1971

John Kent Bowker
INVENTOR.

BY
David A. Rich
Attorney.

3,597,091

INTERFEROMETER

IMPROVED INTERFEROMETER

The present invention relates to interferometers for use in extremely accurate measuring engines and positioning devices.

The use of interferometers in measuring engines is well known in the art. The so-called Michelson interferometer was used successfully to measure a meter rod accurate to one part in $10^8$. The Michelson interferometer is described throughout the literature and is very well known; for example, "Introduction to Geometrical and Physical Optics" by Joseph Morgan, published in 1953 by McGraw-Hill Book Company, Inc., pages 223 to 227 and particularly illustrated on page 224.

In the Michelson interferometer and other subsequent variations, an axial displacement measurement is effected by counting interference fringes produced by the motion of a movable reflecting surface relative to a fixed reflecting surface. In general, a single source of light is collimated and the parallel rays are directed to a beam splitter; for example, a semireflecting mirror oriented at 45°. The beam splitter reflects light to a reflecting surface orthogonally oriented relative to a second reflecting surface intercepting the light energy transmitted through the beam splitter.

Further, when the moving reflecting surface is rotated relative to the fixed or reference reflecting surface, spurious fringe counts appear which falsely indicate linear displacement producing errors proportionate to $a^2$, where $a$ is the angle of rotation, if the device fulfills Abbé's principle, and errors proportional to $ka$ if the Abbé condition is not fulfilled. To avoid the problem of undesirable rotations such an interferometer is typically massive and requires complicated drive systems. It remains extremely sensitive to changes in ambient conditions, a delicate instrument. Such instruments are inordinately expensive for use in a broad range of applications inconsistent with laboratory conditions but which require highly accurate measurements.

In contrast, the present interferometer is immune to a broad range of variables in ambient conditions and is free of errors caused by angular or rotational motion of any magnitude. Consequently, an interferometer embodying the invention requires only a relatively inexpensive, simple, low inertia drive system.

In the past, angular motion produced apparent linear displacement errors as much as two orders of magnitude for angular motion of less than one minute of arc in one coordinate and less than one second of arc in two coordinates.

Thus, prior art interferometers which are designed for measurements along two or more orthogonal measurement axes are particularly sensitive to any errors due to spurious angular or rotational motions.

All classical interferometers are subject to linear displacement error of at least cosine $a$ where $a$ is the angle of rotation.

In accordance with Abbé's principle if the measuring device and the length to be measured are placed in line in such a manner that the measuring device and the object move as a single body, rotational errors are minimized and as noted above, represent a linear displacement error proportional to the square of the angle measured in radians. A single axis interferometer tends to fulfill Abbé's principle, particularly since the motion of the movable mirror is severely constrained. At best, however, there is an error. In contrast, an interferometer embodying the present invention is capable of measuring linear displacements independently of the angular position, or even rotation of the object to be measured relative to a linear displacement translation direction.

No known device, however, fulfills Abbé's principle when simultaneous measurements are made with respect to a pair of orthogonal translation axes.

The cross-coupling between the two axes due to rotation produces at least cosine error in one axis and sine error in the other, resulting in a linear displacement error proportional to a constant times the angle of rotation in radians.

Prior art measuring engines are subject to errors in translation due to changes in levelling and vibration. The errors are aggravated by wear of the ways. In general measurements with such engines can be made with accuracy only after the system, especially the object to be measured, is at rest. Thus, the high accuracy of an interferometer is, heretofore, only available statically. During motion of a stage carrying the object to be measured, errors are produced in translation due to motions of the stage in 6° of freedom. As used herein, the 6° of freedom include rotations about three orthogonal axes and translations along three orthogonal axes. Where measurements are desired only in 2° of freedom, e.g., translation in X and Y, motions of the stage in the remaining degrees of freedom produce excessive errors in apparent linear displacement in the desired translation directions.

In contrast with the above, the interferometer of the invention being immune to linear displacement errors due to rotational motions, retains its accuracy for all degrees of freedom of measurement. In multiple axes systems, no cross-coupling takes place due to rotation.

Because the present interferometer responds only to displacements in desired degrees of freedom, e.g., translations in X and Y, accurate measurements are produced at all times while the object to be measured is in motion. This result enormously increases the usefulness of interferometers for applications requiring dynamic measurements such as control functions. Here the accuracy of measurement while the object to be measured is in motion is the same as that while it is at rest. Furthermore, the instant interferometer is completely free of errors due to wear, variations in levelling and vibrations.

Although the interferometer of the invention is comparatively inexpensive, simple and of low inertia, it is relatively rugged and reliable in operation; measurements of a high order of accuracy are readily reproducible. These benefits are derived from the insensitivity of the system to spurious rotation.

It is therefore an object of the invention to provide an improved interferometer capable of extremely accurate linear displacement measurements independently of angular or rotational motion of the object to be measured with respect to other elements of the system.

Yet another object of the invention is to provide an interferometer of improved accuracy which requires only a relatively inexpensive, simple, low mass drive system.

Still another object of the invention is to provide an interferometer of improved accuracy which is relatively immune to its environment and may, therefore, be used for a broad range of applications outside laboratory conditions.

A still further object of the invention is to provide an interferometer of improved accuracy which is truly rugged and reliable in operation; an interferometer which yields a high order of reproducible measurements of great accuracy and free of the effects of wear.

Yet a further object of the invention is to provide an improved control device for positioning a movable member with high accuracy.

Other and further objects of the invention will be apparent from the following description, taken in connection with the accompanying drawings, and its scope will be pointed out in the appended claims.

In accordance with the invention there is provided mensuration apparatus. The apparatus includes means for providing radiant energy along a first input axis. There are means for providing radiant energy along a second input axis. A rigid body has a pair of reflecting surfaces. The first reflecting surface intersects the first input axis. The second reflecting surface intersects the second input axis. Means are further provided for directing a portion of the radiant energy orthogonally to each reflecting surface independently of the angle of intersection of the reflecting surface to its corresponding input axis.

In one form of the invention the radiant energy is monochromatic, coherent light. The reflecting surfaces are parallel and the light energy is derived from a common source.

In another form of the invention, means are provided for varying the phasing of one polarization component relative to another of the energy along the first input axis.

In another form of the invention the rigid body has a plurality of mutually orthogonal pairs of parallel reflecting surfaces.

The energy means and the portion directing means are rigidly coupled together to define a radiation path. Means are provided for producing relative motion between the rigid body and the rigidly coupled means. A reference point is indicated at the center of the path between the radiant energy means. An indication is produced of the relative translation of the rigid body from the reference point.

Means are also provided to position a member in accordance with a control signal derived from the indication of the translation of the rigid body.

In the preferred embodiment the apparatus is an interferometer in which means are provided for directing the reflected energies to a common interference region. The light energy has a spherical wavefront. Means are further provided for indicating a reference point at the geometric center of the light paths. The reference point is at the intersection of the light paths for translation axes.

Means are included for detecting and counting interference fringes produced by the reflected energies, providing thereby a measure of the translation of the rigid body from the reference point, independently of the rotation of the rigid body with respect to the light paths.

While the interferometer of the invention is useful with radiant energy in its many forms, including, but not limited to electromagnetic and sonic radiation, the preferred embodiment is an optical instrument utilizing light energy. The term "light" as used herein includes, but is not limited to, light frequencies extending from the infrared region to the ultraviolet region.

In one form of the invention then the radiant energy is monochromatic, coherent polarized light energy from a common source for a selected coordinate axis. The reflecting surfaces are preferably parallel. Means are provided for moving the rigid member with respect to a reference point. A displacement of the rigid members produces a changing state of interference to provide an indication of the extent of the displacement from the reference point.

The interferometer of the invention may be used to provide measurements of displacements along two or more orthogonal axes. The rigid member then includes a plurality of reflecting surface pairs. A plurality of sources of radiant energy are included. Radiant energy is then directed to each reflecting surface of each reflecting surface pair. Reflecting energy is directed from each reflecting surface of each reflecting surface pair to a corresponding interference region. Means are provided for moving the rigid member in two or more orthogonal directions and for detecting a plurality of states of interference of the reflected energies in a plurality of the regions. Separable interference fringe patterns are thus produced with respect to a plurality of orthogonal translation axes. In a preferred embodiment a continuous wave laser is used as a source of light energy.

The phase of one light portion is variable relative to the other by the insertion of an odd or extra phasing mirror having a metallic reflecting surface. The relative phase of the energies is varied by varying the angle of incidence to the mirror.

Orthogonal polarization components of the reflected energies are separated after interference along separate sensing paths.

In another form of the invention, a measuring apparatus is provided. The apparatus includes means for providing a first reference frame to locate a fixed reference point. The means include a rigid source means fixed in the frame. Fiducial means indicate a reference point fixed in the frame with respect to the rigid source means.

A second reference frame means is provided. The frame means are relatively displaceable therebetween with more than 1° of freedom. Means coupling the frame means include a medium extending from the rigid source means along at least two paths to the second frame means. Each medium path length varies with displacement of the second frame means with respect to the reference point. The difference between the medium path length varies only with a displacement in 1° of freedom of the second frame means relative to the fixed reference point. The medium path lengths difference is invariant with respect to a relative displacement between the frame means in any other degree of freedom.

The apparatus further includes means for providing an indication of a displacement in 1° of freedom of the second frame means with respect to the reference point independently of a displacement thereof with respect to the reference point in any other degree of freedom.

The interferometer of the invention is insensitive to rotation of the object to be measured because the frame of measurement, e.g., a measurement axis along which the optical path difference is determined, rotates with the object independently of any direction implied by the existence of two sources and the line between them, the means of translating the object or a fixed point of reference.

The optical path length difference so determined thus varies only for translations along the measurement axis and is unvariant for any rotation of the object.

IN THE DRAWINGS

FIG. 7 is a plan view in schematic form of the interferometer in FIG. 5;

FIG. 8 is a side view in schematic form of the interferometer in FIG. 5;

FIG. 9 is a front view in schematic form of the interferometer;

FIG. 10 is an enlarged, plan view in schematic form of a Y-axis optical assembly in the interferometer of FIG. 5 taken along the lines X–X' in FIG. 9;

DESCRIPTION AND EXPLANATION OF THE INTERFEROMETER IN FIG. 1

Figure 1:
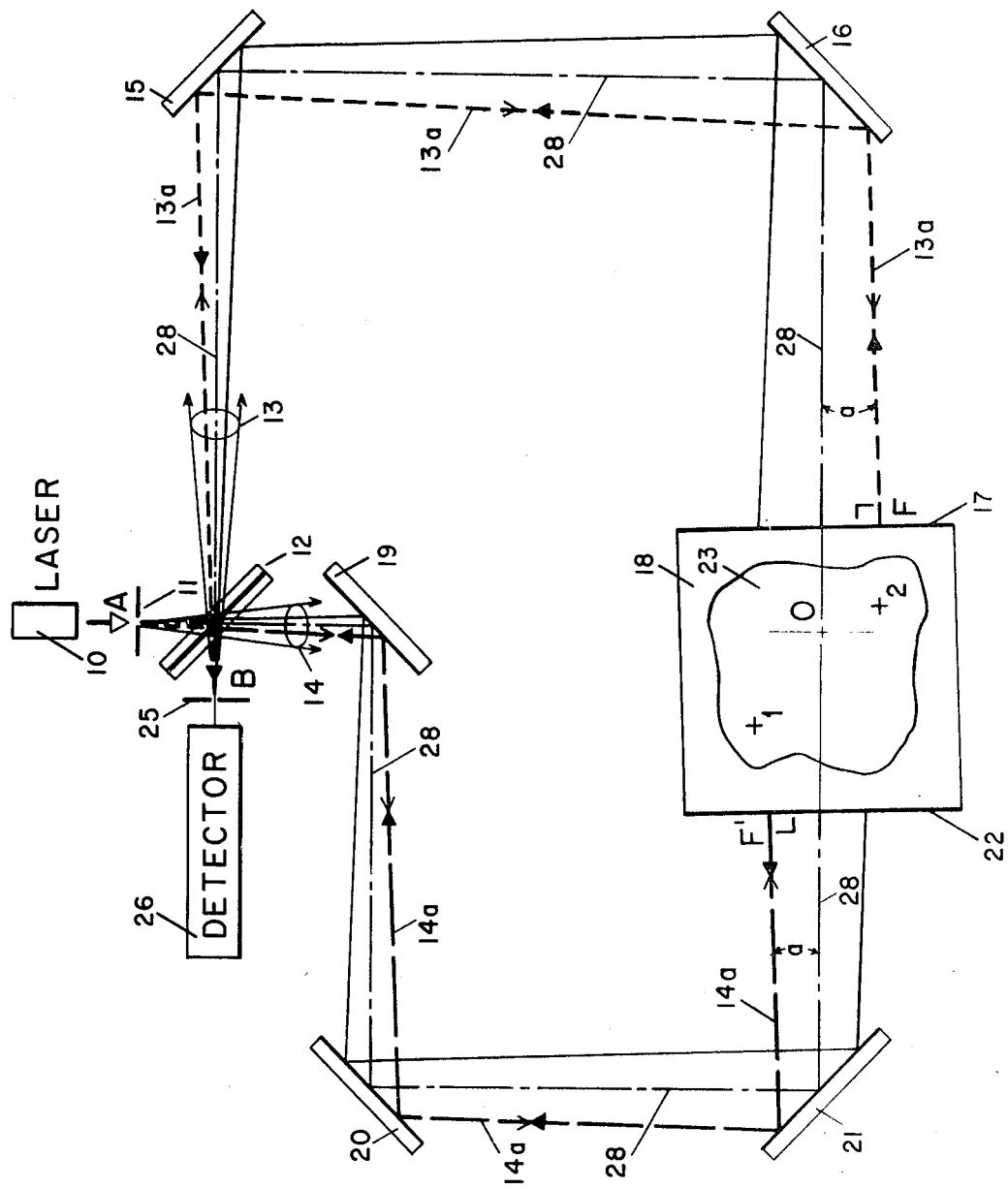
FIG. 1 is a 5 view of a schematic diagram of an interferometer embodying the invention.

Referring now to the drawings and with particular reference to FIG. 1, there is here illustrated an interferometer embodying the invention. A laser light beam is focused on a pinhole to provide a coherent source of light with a spherical wavefront. The light is coupled to a beam splitter which transmits half the energy and, through coupling mirrors, to one of a pair of opposing, parallel reflecting surfaces of a movable rigid body stage plate. The other half of the energy is reflected from the beam splitter and, through coupling mirrors, to the other reflecting surface. A fiducial marks the geometric center or fixed reference point O for the optical paths.

The stage plate is shown rotated relative to the central optical axis and displaced to the left of the reference point O. The normal ray, and only the normal ray, reflected from each reflecting surface travels back along its incident path and is directed by the beam splitter through a pinhole where the reflected energies combine and interfere. A photoelectric detector in the interference region converts the varying light signals resulting from interference into an electrical signal indicative of the linear displacement of the stage plate from the reference point. The output signal is in the form of fringe counts, i.e., the number of light maxima.

A laser 10 directs a coherent beam of monochromatic light to a pinhole A in a plate 11 which produces a spherical wavefront of light. The light travels to a beam splitter 12 and is divided into two portions along two paths so that one light portion travels in a first bundle of rays 13 with a spherical wavefront along a first optical path to the right, as shown, along the central optical axis 28 and the other light portion in a second bundle of rays 14 with a spherical wavefront along a second optical path to the left, as shown, along the central optical axis 28.

The rays 13a and 14a refer to the incident rays normal to the reflecting surfaces 17 and 22 at the points F and F', respectively. The light reflected from the beam splitter 12 is directed to a coupling mirror 15 oriented, e.g., at 45° and, thence, to another coupling mirror 16 to the reflecting surface 17 of a stage plate 18.

The light which is transmitted by the beam splitter 12 is directed, e.g., to a 45° coupling mirror 19, then in sequence to coupling mirrors 20 and 21 to the reflecting surface 22 of the stage plate 18. The reflecting surfaces 17 and 22 are preferably ground parallel. An object 23 to be measured is supported by the stage plate 18.

Means providing a first reference frame include the light source, the beam splitter and the coupling mirrors, all rigidly coupled together. The center of the optical paths is a fixed reference point in the first frame. The stage plate is a rigid body means providing a second reference frame. The first and second frames are relatively displaceable with 6° of freedom. The only displacement sensed, however, is the displacement along a measurement translation axis in the second frame relative to the fixed reference point in the first frame. The stage plate as shown here is a square and is rotated at an exaggerated angle from the central optical axis 28.

A spherical wavefront is produced at the pinhole A; hence, one and only one ray from the bundle 13 directed from A to the reflecting surface 17 is incident to and reflected normal to the surface 17 at the point F. Hence, it follows the same path back to the beam splitter 12 where a portion is transmitted through a pinhole B in an exit plate 25 to the input face of a detector 26 in the interference region.

To avoid errors, a constant difference between the optical path lengths for a given measurement axis is required except for translations along the measurement axis. This condition occurs if and only if the incident light ray is reflected back along its incident path, i.e, the angle between the incident and reflected ray is zero.

Similarly, one and only one ray 14a of the light portion transmitted through the beam splitter 12 is normal to the reflecting surface 22 at the point F'. The ray 14a returns along the same path to be reflected in part by the beam splitter 12 through the pinhole B to interfere with the ray 13a at the input face of the detector 26.

OPERATION

The interferometer of FIG. 1 is a single axis measurement device. The length of the normal from the reference point O to a central plane through the stage plate parallel to the reflecting surfaces 17 and 22 is a measure of the displacement of a point on the object to be measured from the reference point O.

A measurement is made then in the following manner: A fiducial representing the reference point O, such as a crosshair, is viewed through a microscope. The displacement of the point $+_2$ from the point $+_1$ is measured by moving the stage plate until the fiducial coincides with the point $+_1$. This has the effect of decreasing the length of the path of the normal incident ray 13a and increasing the path of the ray 14a.

The stage plate is then moved until the point $+_2$ is under the fiducial. As the stage plate moves from the point $+_1$ to the point $+_2$ the length of the path 13a increases and that of the path 14a decreases. As the stage plate 18 moves, its displacement relative to the point O constantly changes the difference between the path lengths 13a and 14a. This in turn produces a changing interference condition which is detected by the detector 26.

Figure 2:
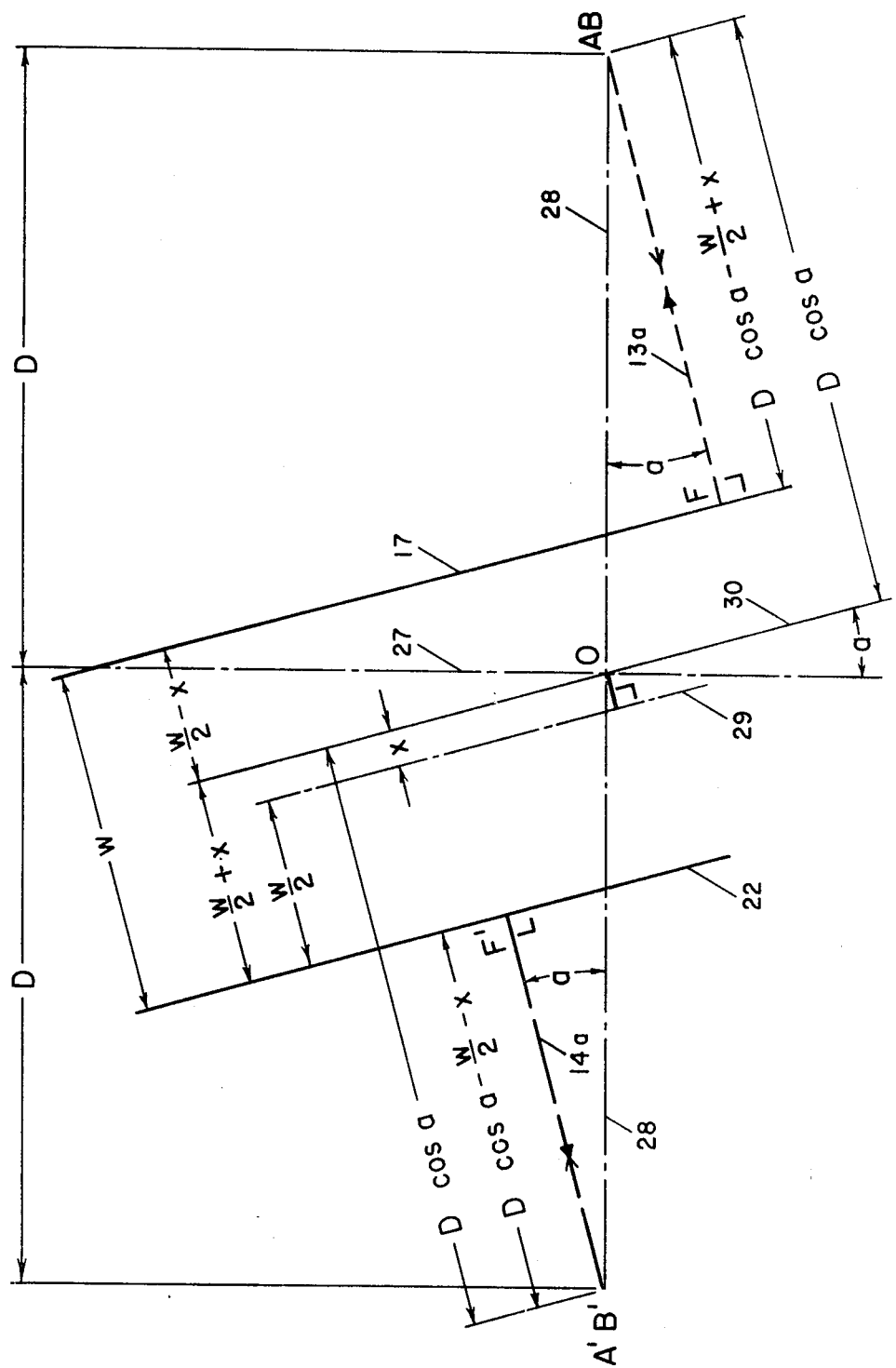
FIG. 2 is a diagram of optical paths illustrating an aspect of operation of the embodiment in FIG. 1.
Figure 3:
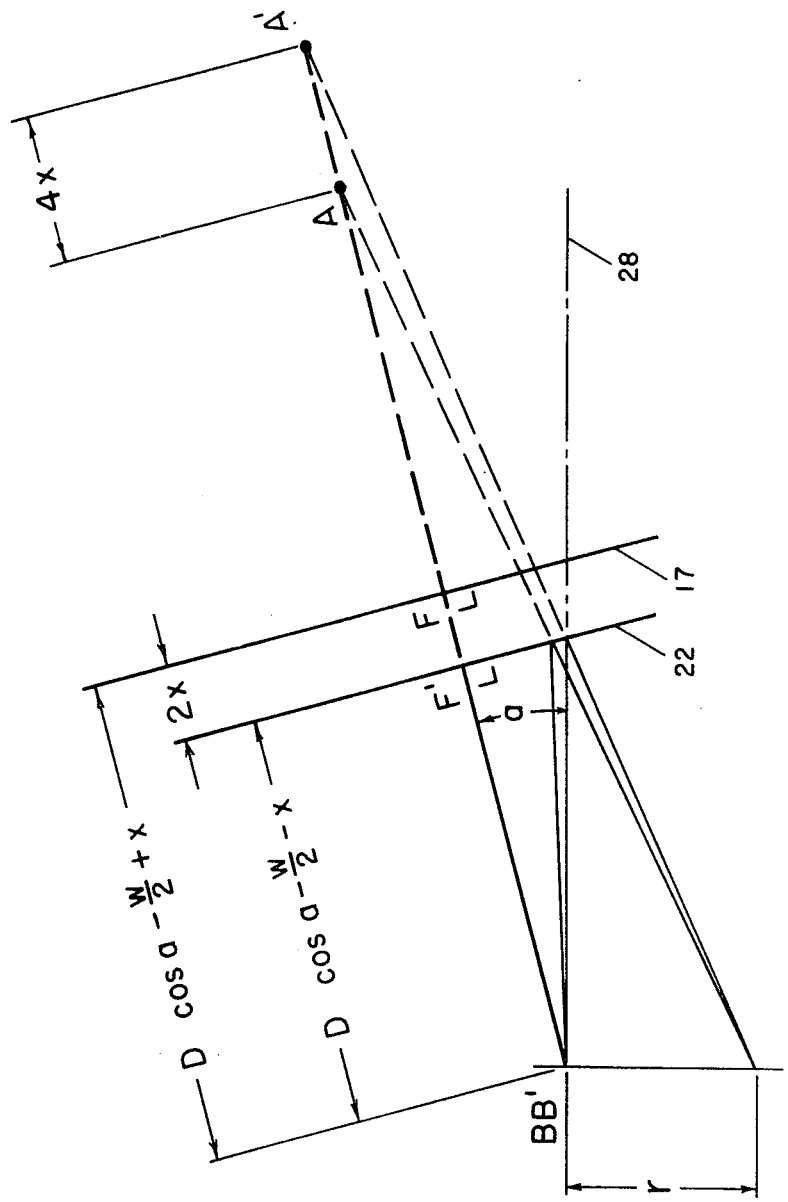
FIG. 3 is a diagram of optical paths illustrating another aspect of the operation of the embodiment in FIG. 1.

Referring now to FIGS. 2 and 3, the principles of operation of the interferometer in FIG. 1 will be discussed.

An important feature of the interferometer in FIG. 1 is its relative freedom of errors in linear translation measurement as the stage plate 18 is rotated through an angle $a$ about a conventional translation axis, say the X axis. Note that the stage plate may be constantly rotated at some rate without interfering with such a translational measurement. In particular, for rotation about O, the path difference $4x$ for all values of angle $a$ remains a constant. This result is derived from an analysis of FIG. 2.

Consider then that the stage plate is displaced a distance $x$ from the fiducial or reference point O at the geometric center of the total optical paths 2D, the distance between the sources AB and A'B', taken from A' as virtual image for A and B' as virtual image for B. Then AB is coincident with A'B' when the paths are unfolded since the path from the beam splitter 12 to A is the same as the path from it to B.

In order to establish that the system is indeed free from errors due to a displacement in a degree of freedom other than translation along the measurement axis in the stage plate, let us consider the path difference when the stage plate is rotated an angle $a$ relative to the central axis 28 and is displaced in translation from the reference point O along the normal to its central plane 29 parallel to the reflecting surfaces.

To determine the signal produced at the face of the detector 26 in the interference region, the path difference may be calculated between the paths 13a and 14a. The stage plate of width $w$ is ground so that the opposing reflecting surfaces 17 and 22 are parallel. In the diagram of FIG. 2 the paths 13a and 14a are unfolded, showing the interfering beams taking the path 13a to the left and 14a to the right.

Assuming the length of the distance between the sources to be $2D$, the virtual image which appears at B in the diagram of FIG. 2 is unfolded to coincide with the pinhole A. There appears then to be for purposes of analysis two rigidly coupled sources of energy defining the central optical axis 28 with the fixed reference point at O. Let $x$ be designated as the distance from the fiducial point O along the normal to the central plane 29 of the stage plate, here shown rectangular.

The calculation of the optical pathlengths AFB and A'F'B' may be obtained directly in terms of the distance $x$ from O along the normal to the central plane 29. Since A and B are coincident, as noted above, path 13a is normal to the reflecting surface 17. Similarly, path 14a is normal to surface 22. Construct a line 30 parallel to the central plane 29 and passing through O. Since $AO=D$ and $A'O=D$, the distance along the extension of paths 13a and 14a from $A$ or $A'$ to the line 30 is $D \cos a$. The point of reflection of path 13a lies a distance $w/2-x$ from the line 30, thus the distance $AF=D \cos a-w/2+x$. Since the returning path is coincident, the total path is Equation (1)   $AFB=2(D \cos a-(w/2+x))$.

Similarly the path

Equation (2)   $A'F'B'=2(D \cos a-(w/2)-x)$

The path difference then is

Equation (3)

$A'F'B'-AFB=2(D \cos a-(w/2+)x)-2(D \cos a-(w/2-)x)=4x$

It will be seen then that given a translation $x$ from a point in the stage plate frame, the path difference is invariant with respect to rotations of the stage plate about the reference point O. Thus, a translation measurement with the interferometer illustrated in FIG. 1 is completely independent of the angle of the stage plate 18 to the optical axis 28 if the reference O is taken at the center point between the apparent sources A and A'.

When the stage plate is moved from the location $X_1$ to another position $X_2$, the displacement is
Equation (4)   $X_{21} = X_2 - X_1$
When the path difference is equal to an integral number $n$ of wavelengths, i.e.,
Equation (5)   $4x = n\lambda$, constructive interference occurs. When the path length is an odd number of half-wavelengths, that is,
Equation (6)   $4x = (2n+1)(\lambda/2)$ destructive interference results.

The total number of changes represents the displacement along a measurement axis normal to the reflecting surfaces.

Note that regardless of a displacement in any other independent degree of freedom, no change in the interference condition takes place.

The light intensity in the interference region at B goes through a maximum each time
Equation (7)   $x = n(\lambda/4)$ The variation from light maximum to light minimum back to light maximum produces fringe counts as the stage plate 18 is translated from the point $X_1$ to the point $X_2$. Then
Equation (8)   $X_{21} = (N\lambda/4)$, where
Equation (9)   $n_2 - n_1 = N$ is the number of observed counts. It will be apparent that the least displacement measurable by simply counting intensity maxima is equivalent to one-fourth of a wavelength. Thus, the lease displacement measurable by counting intensity maxima is half as great as that obtained with the fixed reference mirror type of interferometer.

For a neon-helium laser the light beam produced characteristically has a wavelength of 0.632815 microns. The least measurement of displacement would then appear to be 0.159704 microns which is equivalent to 6.28756 microinches. However, by using two light polarizations, one of which will not interfere with the other and by placing these in quadrature through the use of a quarter wave plate or similar device, the least count is reduced to one sixteenth of a wavelength, i.e., 0.039926 microns or 1.5719 microinches.

The least measurable interval can be substantially reduced by using phase comparison techniques which are known in the art.

MECHANICAL IMPLICATIONS

If the points A'B' and AB in the first frame are considered to be fixed support points, a linkage medium from A'B' to the surface 22 and another from point AB to the surface 23 may be introduced.

The linkage medium may be a spring with a net force in the direction of the fixed point and a substantially frictionless slidable coupling to a parallel surface. In accordance with the principle of least action, the spring conforms with the shortest path between its fixed support point and its corresponding parallel surface; i.e., it always assumes the least pathlength and, therefore, is always normal to its coupled parallel surface. With rotation of the stage plate counterclockwise about the reference point O, for example, the pathlengths decrease equally, the springs always operating to find the least path normal to the parallel surfaces. Conversely, rotation of the stage plate clockwise about the reference point O increases the pathlengths equally. The difference between the pathlengths then remains a constant, except when the stage plate is translated from the reference point along the normal to the central plane of the stage plate. The measurement of pathlength difference may be indicated, for example, by sensing the spring forces with appropriate transducers and comparing them.

In a sense the incident light ray normal to each reflecting surface is effectively slidably coupled to the surface. Thus, the term linkage medium or coupling medium in this context includes, but is not limited to, media coupling means providing a first frame of reference to define a fixed reference point, such as the earth, i.e., observer's, frame, to means providing a second frame of reference, such as the stage plate or the object to be measured.

The coupling medium has the property of conforming to the least path from a fixed support point in the first frame normal to a surface fixed in the second frame.

The mechanical equivalent of the interferometer of FIG. 1 is more nearly realized by replacing the coupling mirrors with pulleys fixed in the first frame relative to a single fixed support point, for example, in place of the beam splitter. The coupling medium extends from the fixed support point around the pulleys to the parallel surfaces; the pathlengths varying between the pulleys directly coupled to the parallel surfaces.

The coupling medium may be inelastic if, for example, a device is included which operates to maintain the medium taut in response to rotation of the stage plate.

The pathlength difference for an inelastic medium is always directly indicated by the takeup device maintaining a taut coupling. The direction of translation is immediately indicated by the direction of rotation if the takeup device is, for example, rotary.

A similar result to the above is achieved by introducing the coupling medium from a fixed point between, for example, a pair of parallel reflecting surfaces rigidly coupled together, which now reflect inwardly. In such an embodiment of the invention monochromatic, coherent light emanates from a pinhole A and a portion is transmitted through a beam splitter to a reflecting surface. The other portion is reflected by the beam splitter and coupling mirrors which direct it in the opposite direction from and colinear with the first portion to a parallel reflecting surface. As noted above, the two reflecting surfaces face each other. Again, the normal rays are reflected back through the beam splitter through an exit pinhole.

ABBÉ PRINCIPLE

In the past all measuring engines which met the Abbé condition most closely at least were subject to translational displacement errors due to rotation in proportion to the cosine of the angle of rotation of one element of the engine relative to another. No known measuring engine meets the Abbé condition, however, while one element is in motion relative to another, because some displacement takes place in such a condition in all 6° of freedom.

With respect to any frame of reference, all moving bodies have 6° of freedom, displacements in translation along the mutually orthogonal X, Y and Z axes, and angular displacements about the X, Y and Z axes. If one wishes to measure displacements in a selected one or two degrees of freedom, to avoid error, the measurement so made must be independent of displacements in any other degree of freedom.

In the past, displacement measurements, angular measurements and distance measurements of objects have always been taken in the observer's frame. Thus, while the object is in motion, the displacements in the 6° of freedom are not independent relative to the observer's frame. If, however, the subject being measured can be isolated therefrom, the object itself becomes a reference frame and carries its own coordinate system which is invariant with respect to and independent of the observer's frame. If the object to be measured is planar, all measurements of points in the plane of the object with respect to its own coordinate system are thus independent of any motion of the object relative to the observer's frame.

In the present invention, the object to be measured presents a second frame of reference within which it and the measurement scale are indeed rigidly coupled together, thereby completely meeting Abbé's condition.

Displacement from a fixed reference point in the first frame may be readily determined by fixing the location of a point in the second frame coincident with the fixed reference point. A measurement of the position of a point in the second frame relative to its own coordinate system, e.g., along the single translation measurement axis, at once becomes a measure of its position relative to the fixed reference point in the first frame.

In the present interferometer, the position of the exit pinhole B is uniquely determined. From the analysis of FIG. 2, it is indeed apparent that the points A and B must be equidistant from the reference point O. This is the only location for the point B at which the center of the interference fringe pattern is stationary. Since the location of the point B is fixed for all values of angle $a$, or for that matter a displacement in any other independent degree of freedom, the problem of a shifting interference fringe pattern due to misalignment is totally eliminated. Again, this result is unique.

The diameter of the pinhole B in the plate 25 is subject to opposing requirements. In the first instance it is desirable for the hole to be as large as possible to gather as much light as possible. Secondly, the hole should be as small as possible to preserve fringe visibility.

The nature of the interference pattern at the plane of the plate 25 and the necessary size of the pinhole B may be analyzed by referring to the diagram in FIG. 3. The diagram in FIG. 3 is derived by rotating the arm indicated by the optical path 14 about the O reference so that the image at B' coincides with the image at B and the virtual images equivalent to A and A' are derived by extending the rays to indicate the virtual image sources behind the mirrors.

The displacement $r$ from BB' is the distance off the axis in the plane of the plate 25. It is useful to determine the path difference $A'r-Ar$ as a function of $r$. From FIG. 3 it will be apparent that:

Equation (1)
$$A'r^2 = r^2 + B'A'^2 + 2rB'A' \sin a$$
and
Equation (11)
$$Ar^2 = r^2 + BA^2 + 2rBA \sin a,$$
so that
Equation (12)
$$A'r - Ar = \sqrt{r^2 + B'A'^2 + 2rB'A' \sin a}$$
$$-\sqrt{r^2 + BA^2 + 2rBA \sin a}.$$

Equation (13)
$$A'r - Ar = B'A'\sqrt{1 + \frac{r^2 + 2rB'A' \sin a}{B'A'^2}}$$
$$- BA\sqrt{1 + \frac{r^2 + 2rBA \sin a}{BA^2}}$$

Since $r$ is much less than $B'A'$ or $BA$,
Equation (14)
$$A'r - Ar = B'A'\left(1 + \tfrac{1}{2}\frac{r^2 + 2rB'A' \sin a}{B'A'^2}\right)$$
$$- BA\left(1 + \tfrac{1}{2}\frac{r^2 + 2r\,BA \sin a}{BA^2}\right)$$
$$= 4x + \tfrac{1}{2}\left(\frac{r^2}{B'A'} + 2r \sin a - \frac{r^2}{BA} - 2r \sin a\right)$$
$$= 4x + \frac{r^2}{2}\left(\frac{1}{B'A'} - \frac{1}{BA}\right)$$
$$= 4x - \frac{r^2}{2}\frac{4x}{B'A' \cdot BA}$$
where,
$$B'A' \cdot BA = 4\left(D \cos a - \frac{w}{2}\right)^2 - X^2$$

The analysis yields the result that the interference pattern is composed of a set of concentric circles or, at large angle $a$, ellipses. The diameter of the pattern is a function of $x$, and it is centered at $r=0$, regardless of the angle of the stage plate 18 or the translation displacement $x$ from the reference point O. Thus, the interferometer of FIG. 1 cannot be misaligned by erratic motions of the stage plate 18 during a translation.

DESCRIPTION AND EXPLANATION OF THE INTERFEROMETER IN FIG. 4

Figure 4:
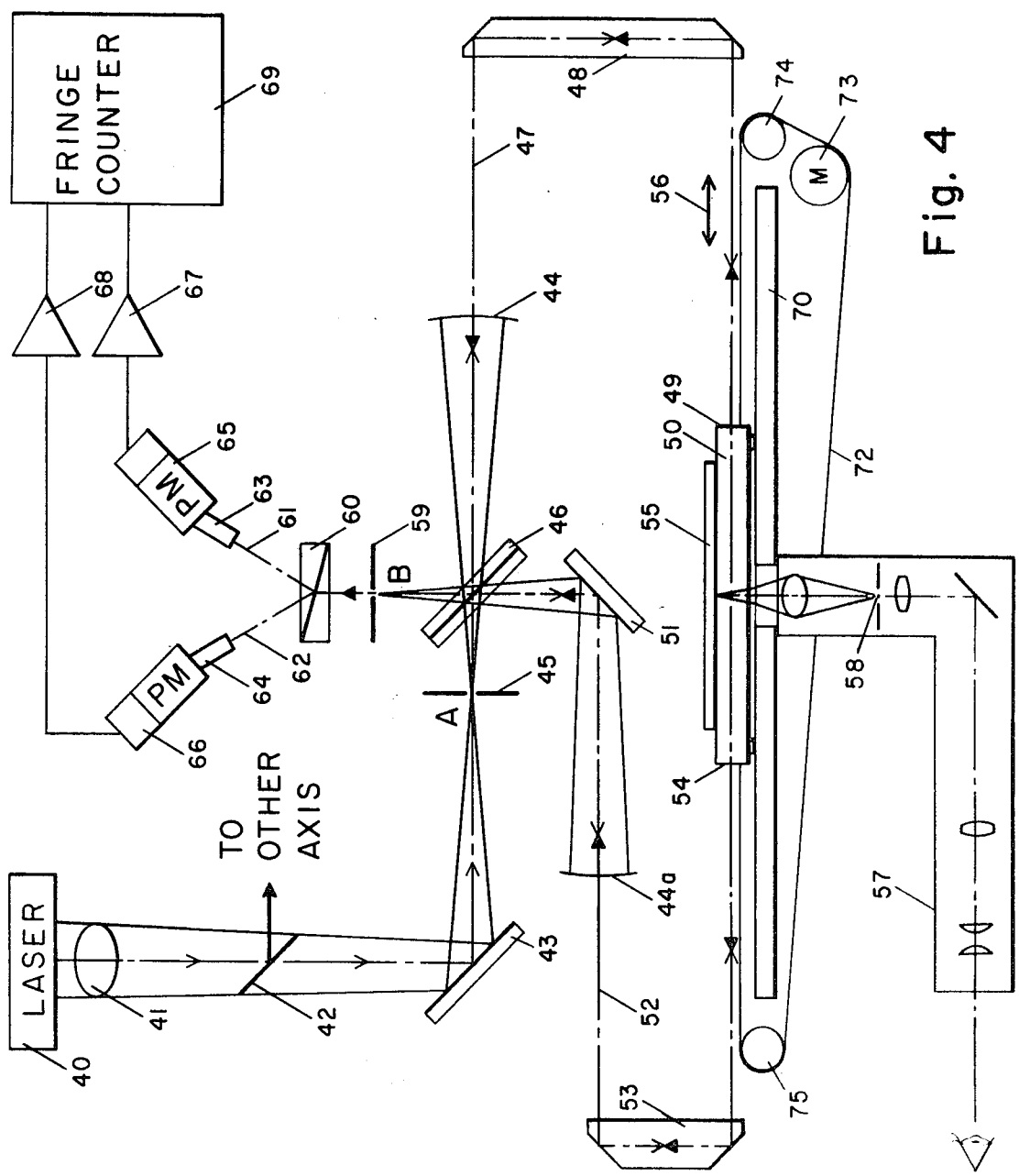
FIG. 4 is a plan view of a more detailed schematic diagram of a single translation axis interferometer embodying the invention.
Figure 5:
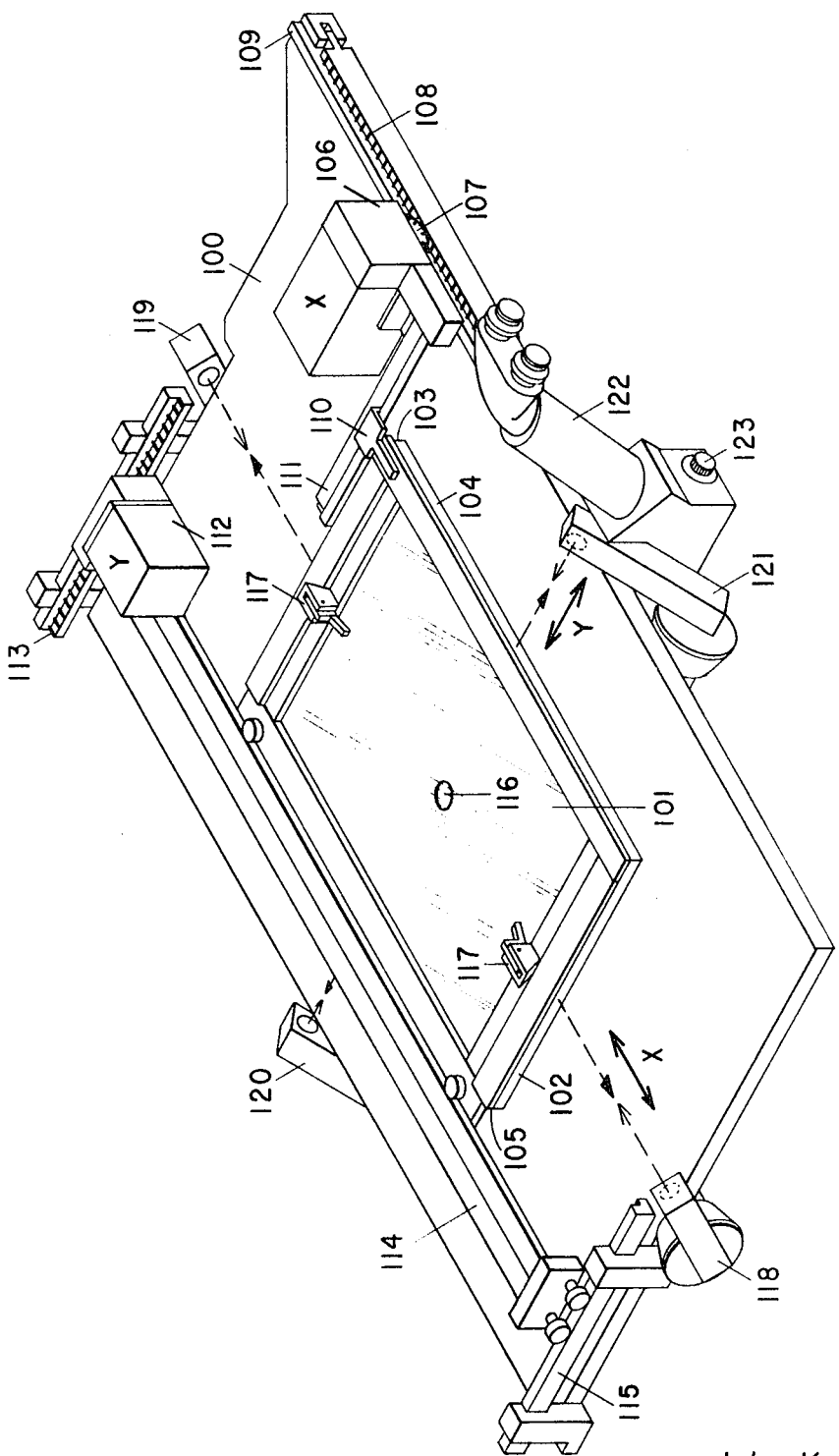
FIG. 5 is a perspective view of a two axes interferometer embodying the invention, particularly illustrating the mechanical drive system and relative orientations of the opposing light paths for each axis.

Referring now to FIG. 4 there is here illustrated a single axis portion of an interferometer which is capable of sensing direction of displacement along a measurement axis. Here a single laser source is shown providing a light source for use in more than two axes of linear measurement. In addition, the interferometer as shown has been modified to provide a sense of direction for a single axial measurement.

In the past direction is typically sensed by correlating or comparing different parts of the fringe pattern. Another method involves the use of parallel beams with one detector in phase quadrature with the other.

Here there is only one possible path from the source to the detector and the fringe pattern broadens until at zero displacement the radius of the first dark ring becomes infinite. Since the fringe size here varies with displacement, it is necessary to divide the input energy into two independent orthogonally polarized beams which may follow coincident paths. If the plane of polarization of the laser is rotated 45° relative to the plane defined by the optical paths, the beam is then equally resolvable into equal vertical and horizontal components which can be separated at the exit pinhole B.

A phase shift is introduced between these components by using a metallic reflecting surface which intersects one optical path and not the other. A metallic reflecting surface as is well known, produces different phase shifts in the orthogonal polarization components on reflection. Thus, the energy linearly polarized at 45° becomes elliptically polarized on reflection from the metallic surface. The amount of phase shift incurred can be varied by changing the angle of incidence.

Referring then to FIG. 4 in detail, the laser 40 is coupled through a focusing lens 41 to a beam splitter 42 which divides the energy into two sources of light useful for more than one measurement axis.

Light energy is transmitted through the beam splitter 42 to a 45° coupling mirror 43 and is focused on a pinhole A in an entrance aperture plate 45. The light emerging from the pinhole A is directed with a spherical wavefront to a beam splitter 46. A portion of the energy is transmitted through the beam splitter 46 along optical path 47 to an end prism 48 which provides two corner reflectors directing the energy to a reflecting surface 49 of the stage plate 50.

The energy portion reflected by the beam splitter is directed to a metallic phase shifting mirror 51 along an optical path 52 to an end prism 53 having two corner reflectors which then direct the energy to a reflecting surface 54 on the stage plate 50. An object 55 to be measured is carried by the movable stage plate 50, which is displaceable along a linear translation axis 56.

A viewing microscope is generally indicated at 57 and includes a fiducial 58 which is imaged on the reference point. The stage plate 50 is formed of glass. Because of the index of refraction of the glass, the fiducial appears to be at the surface of the stage plate in contact with the object 55 to be measured. The object for example may be a photograph. As described above, the reflected energies return to the beam splitter 46 and are directed through the pinhole B in an exit plate 59 through a Wollaston prism 60 which separates the beams in accordance with their planes of polarization along optical paths 61 and 62 to a pair of detectors including light pipes 63 and 64 leading to a pair of photomultiplier tubes 65 and 66. The photomultipliers are coupled through a pair of amplifiers 67 and 68 to a fringe counter 69 which provides an indication of the degree and direction of displacement.

The fringe counter includes means for comparing the phase of the video signals to produce output counts which for example, may be voltage polarized plus or minus corresponding to left or right motions.

A means for moving the stage plate is provided by the belt 72 connected to the stage plate which causes the stage plate to slide on surface 70. A motor 73 drives the conveyor belt 72 around a pair of pulleys 74 and 75. Because of the independence of rotation, the stage plate can be moved by hand, if necessary. The motor 73 and belt 72 are provided for convenience, to respond, e.g., to an electrical signal provided by an appropriate programmer.

OPERATION

The laser, the aperture plates, the coupling mirrors, the photomultipliers and the coupling prisms, the support surface 70, the motor 73 and the pulleys 74 and 75, the fiducial 58 and its imaging elements are all rigidly coupled together. The stage plate 50 and the object 55 are movable relative to these elements. The fiducial as viewed through the microscope 57 is fixed in space and is, therefore, effectively rigidly coupled to the other elements which are all located in the first frame of reference.

The object 55 is rigidly clamped to the stage plate 50 by means which are not shown in the drawing. A measurement is made between two points on the object 55 by locating the first point at the fiducial and translating until the fiducial is coincident with the second point. While the object is in motion the fringe counter 69 produces at all times an indication of the distance of the first point from the fiducial along a translation measurement axis in the coordinate system of the stage plate as discussed below with reference to FIG. 2. When the second point is reached, a measure of the displacement between the two points along the stage plate or object measurement axis is accurately measured and displayed.

DESCRIPTION AND EXPLANATION OF THE INTERFEROMETER IN FIGS. 5—10

Referring now to FIG. t there is here illustrated an isometric view of an interferometer embodying the invention. The interferometer, as shown, is designed to provide accurate measurements of linear distances in a plane. This implies a two axes translation system with an X-axis drive system and a Y-axis drive system. The optical system is rigidly coupled to a table which is, for example, coupled to the earth. The stage plate is free to move in X and Y translation, on the surface of the table.

An X-axis servomotor rides on a track and, for example, has a pinion gear which engages a rack on the table to translate the stage along the X translation axis. The Y-axis drive system includes a pair of tracks tending to restrain the motion of the stage plate parallel to the Y axis tracks. The stage plate, however, is coupled to another track carried by the Y-axis drive system so that it can be translated orthogonally by the Y-axis drive system. The stage plate has two pairs of mutually orthogonal, parallel reflecting surfaces.

A microscope is included to observe the position of the fiducial relative to points to be measured on an object to be measured, such as, for example, a photographic plate. Point to point measurements on a photographic plate are necessary frequently in order to relate such measurements to distances on earth for purposes of aerial survey and reconnaissance work.

In order to obtain separation of the exit reflected energies, the incoming energy from a laser source is plane polarized, for example, with the electric vector vertical. The elements for the optical system of each axis are disposed in a plane at a 45° angle to, for example, the direction of the electric vector in the plane of polarization of the incoming energy. The elements are physically disposed on the surfaces of a truncated pyramid having top and base surfaces parallel to the table and the stage plate. The side surfaces of the truncated pyramid are oriented in planes 45° relative to the plane of the table and hence relative to the electric vector of the input plane polarized light energy.

The fiducial is viewed through an optical system rigidly coupled to the table. A hole in the table enables the projection of the fiducial at the surface of the stage plate which is formed from glass.

A table 100 is fixed to earth and carries a glass stage plate 101 which is translatable with 2° of freedom in X and Y. The stage plate has two pairs of mutually orthogonal, parallel surfaces 102, 103 and 104, 105.

As discussed above the system responds only to translations measured along the orthogonal measurement axes in the stage plate relative to the fiducial. Consequently, the drive system for the stage plate is fairly crude; it need not in any sense involve a precision drive system. Thus, here an X-axis drive motor 106 is coupled to a pinion gear 107 which engages a rack 108 formed in the table 100. The motor 106 travels on a track 109. The stage plate 101 is coupled through a hinge 110 to a track 111 fixed to the motor 106. The motor is translatable along the X-axis while the stage plate is slidable along the track 111 orthogonally to the X-axis.

A Y-axis servomotor 112 has a pinion gear which engages a rack 113 fixedly coupled to the table 100. A rail 114 is coupled to a track 115 to restrain the motion in the Y direction parallel to the tracks 113 and 115; the pinion gears are not shown. A viewing aperture 116 is formed in the table 117 to enable the fiducial to be imaged on the surface of the stage plate. A pair of adjustable clamps 117 are used to clamp down an object to be measured, such as a photograph with its emulsion face down on the stage plate.

The X-axis optical system has a pair of arms 118 and 119 which project opposing light paths to the reflecting surfaces 102 and 103, respectively. The Y-axis optical system has a pair of arms 120 and 121 which project light to the opposing reflecting surfaces of the stage plate 105 and 104, respectively. A microscope 122 is used for viewing the fiducial. A knob 123 is used to change the character of the fiducial for example from a ring, a pair of crosshairs, or an opaque dot; the sizes of the fiducial may be varied in accordance with the size of the object viewed. As in FIGS. 1—4 above, the open arrows indicate the stage plate incident light and the closed arrows indicate the stage plate reflected light.

Figure 6:
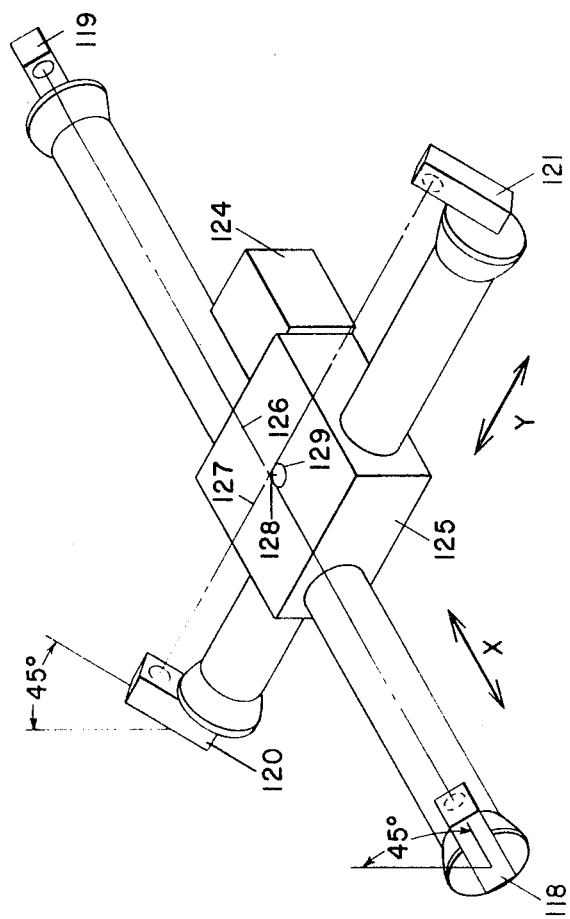
FIG. 6 is a perspective view of the optical arms as removed from the drive table.

The optical system assembly is shown in FIG. 6 where a laser housing 124 is coupled to a central housing 125 which includes the truncated pyramid described above. As can be seen from FIG. 6, the X and Y optical paths 126 and 127, respectively lie in planes at 45° relative to the vertical. The intersection of the X-axis optical path 126 and the Y-axis optical path 127 occurs at the fixed reference point 128 for the interferometer. An aperture 129 in the housing 125 corresponds with the aperture 116 in the table to enable imaging of the fiducial effectively at the reference point.

In FIG. 7 a plan view of the interferometer schematically illustrating the basic optical system is shown. In the laser housing a laser 128 projects a light beam on a focusing lens 129 which focuses light on entrance pinholes in the input aperture plates for each of the X and Y optical axis components. The monochromatic, coherent light travels along a central optical axis 131 to a beam splitter 132. The beam splitter 132 is, for example, oriented at an angle relative to the incoming light energy, but its plane is perpendicular to that of the stage plate 101. The beam splitter 132 is located on a truncated prism 133 having opposing surfaces 134 and 135 extending from the base of the pyramid upwardly and inwardly at an angle of 45° relative to the plane of the stage plate. Similarly, surfaces 136 and 137 extend from the base upwardly and inwardly in planes at 45° relative to the stage plate.

The light energy portion transmitted by the beam splitter 132 is directed to the left and up, as shown, to a Y-axis optics housing 155. The reflected light portion from the splitter 132 is directed upwardly and left, as shown, to an X-axis housing 154. The upper parts of housings 154 and 155 have been removed in FIG. 7 for greater clarity. The energy is coupled to a mirror 138 which directs the X-axis energy to focus at a pinhole A, as shown in FIG. 10, and then to an X-axis beam splitter 139 in the X-axis optics housing 154. The plane of the mirror 138 is perpendicular to the plane of the stage plate 101. The plane of the beam splitter 139, however, is perpendicular to the plane of the 45° surface 136 and is therefore, oriented at a 45° angle relative to the vertical electric vector in the plane of polarization of the input X-axis light energy portion.

The X-axis energy portion transmitted through the beam splitter 139 extends to the left along the X central optical axis 126 to a coupling mirror 140 and thence to a coupling mirror 141 to the reflecting surface 102. The reflected portion from the splitter 139 is directed to a coupling phase mirror 142 which directs the energy along the X central optical axis 126 to the right, as shown, to a coupling mirror 143 and thence to a coupling mirror 144 to the reflecting surface 103.

The Y-axis energy portion is transmitted through the beam splitter 132 to the left, as shown, to a coupling mirror 145 where it is directed to focus on a pinhole A, shown in FIG. 10, and then to a Y-axis beam splitter 146. The reflected portion of the Y-axis energy is directed to a phase coupling mirror 147 and thence, downwardly, as shown along the Y optical axis 127 to a pair of coupling mirrors 148 and 149 and to the reflecting surface 104. The portion of the Y-axis energy which is transmitted through the beam splitter 146 extends along the Y-axis 127 upwardly to a pair of coupling mirrors 150 and 151 and to the reflecting surface 105.

To enhance the clarity of the drawing the rays have not been shown in bundles as was illustrated in FIG. 1, for example. The light energy in all cases has a spherical wavefront and represents a bundle of energy traveling along the central optical X and Y axes. The returning ray in each case is only from the incident ray normal to the stage plate reflecting surface.

The plane of the X-axis optical path is at an angle of 45° to the stage plate 101 and parallel to the side 136. The planes of the splitter 139 and mirrors 140—144 are normal to the side 136.

Similarly, the plane of the Y-axis optical path is parallel to the side 135; the planes of the splitter 146 and the mirrors 147—151 are perpendicular to the side 135.

A fiducial image is shown at 152 in the aperture 153 in the pyramid housing. The X-axis optical assembly housing 154 lies on the surface 136 and the Y-axis optical assembly housing 155 lies on the surface 135.

The orientation of the complete X-axis housing 154 is shown in the side view of FIG. 8; the orientation of the complete Y-axis housing 155 is shown in the front view of FIG. 9. For clarity, the coupling optical elements are not shown.

In FIG. 9 a portion of the optical system of the microscope for viewing the fiducial is shown. In effect the fiducial is projected, in the absence of the stage plate 101, to the intersection of the X and Y light paths. With the stage plate in place, however, the fiducial appears to be at the upper surface of the stage plate because of the effect of refraction by glass.

A plan view of the Y-axis housing 155 and its components, taken along the lines X–X' in FIG. 9, is shown in FIG. 10. The X-axis housing 154 and its components correspond directly with FIG. 10, although disposed on side 136. For clarity, not all elements in FIG. 10 are shown in FIGS. 5—9.

The Y-axis housing 155 includes an entrance aperture plate 156 having a pinhole A and an exit aperture plate 157 having a pinhole B. The Y-axis energy entering the pinhole A comes from the coupling mirror 145 as indicated. It goes to the beam splitter 146 which directs a portion of the Y-axis energy, as noted above, to the phasing coupling mirror 147. The reflected energy portion from the phasing mirror 147 is directed to the coupling mirror 148 as indicated. The transmitted portion from the splitter 146 is directed to the coupling mirror 150 as indicated.

The reflected energy from the stage plate is reflected along an exit path 158 to the exit pinhole B in the plate 157. The reflected energy from the surface 105 comes from the coupling mirror 150 and is reflected by the beam splitter 156 along the exit path 158 with the two reflected energies combine and interfere. The combined reflected energies are transmitted to the pinhole B to a prism 159 which separates orthogonal polarization components to extend along separate orthogonal polarization components to extend along separate paths 160 and 161 to a pair of photomultiplier tubes 162 and 163. A similar description applies to the X-axis exit assembly.

OPERATION

The terms X and Y have been used interchangeably to identify the orthogonal measurement axes as well as the orthogonal translation axes. The measurement axes, however, are totally independent of the translation axes. The translation axes X and y roughly correlate with the measurement axes X and Y. As noted above, however, the translation axes are taken with respect to one frame of reference while the measurement axes are taken with respect to a different frame of reference, that of the object to be measured. If the stageplate is moved in r and θ, i.e., if the motion of the stageplate is rotational through a pivot arm about a pivot point in the first frame of reference off the stageplate at some distance from the optical axes, and further, is radially extensible relative to the pivot point, only translations along the orthogonal bisecting planes between the mutually orthogonal pairs of parallel reflecting surfaces are measured.

In operation then a point on the object to be measured, for example a photograph, is made to coincide with the fiducial by viewing the fiducial through the microscope 122 and applying electrical signals to the X and Y drive motors until the selected point coincides with the fiducial at which time the signals are removed.

The indicated interference count is then set at zero for both the X and Y axes. An electrical signal is then applied to each of the X and Y drive motors 106 and 112 respectively until a second selected point is observed to coincide with the fiducial. At that time the signals are removed and the indication of interference counts produced is noted. A measure of translation in each of the X and Y measurement axes is obtained from which the lineal distance between the two points is readily derived.

The photograph need not be carefully aligned. It is merely placed with the emulsion side down on the stage plate and the clamps 117 are snapped down to hold it in place.

DESCRIPTION AND EXPLANATION OF THE POSITIONING APPARATUS IN FIG. 11

Figure 11:
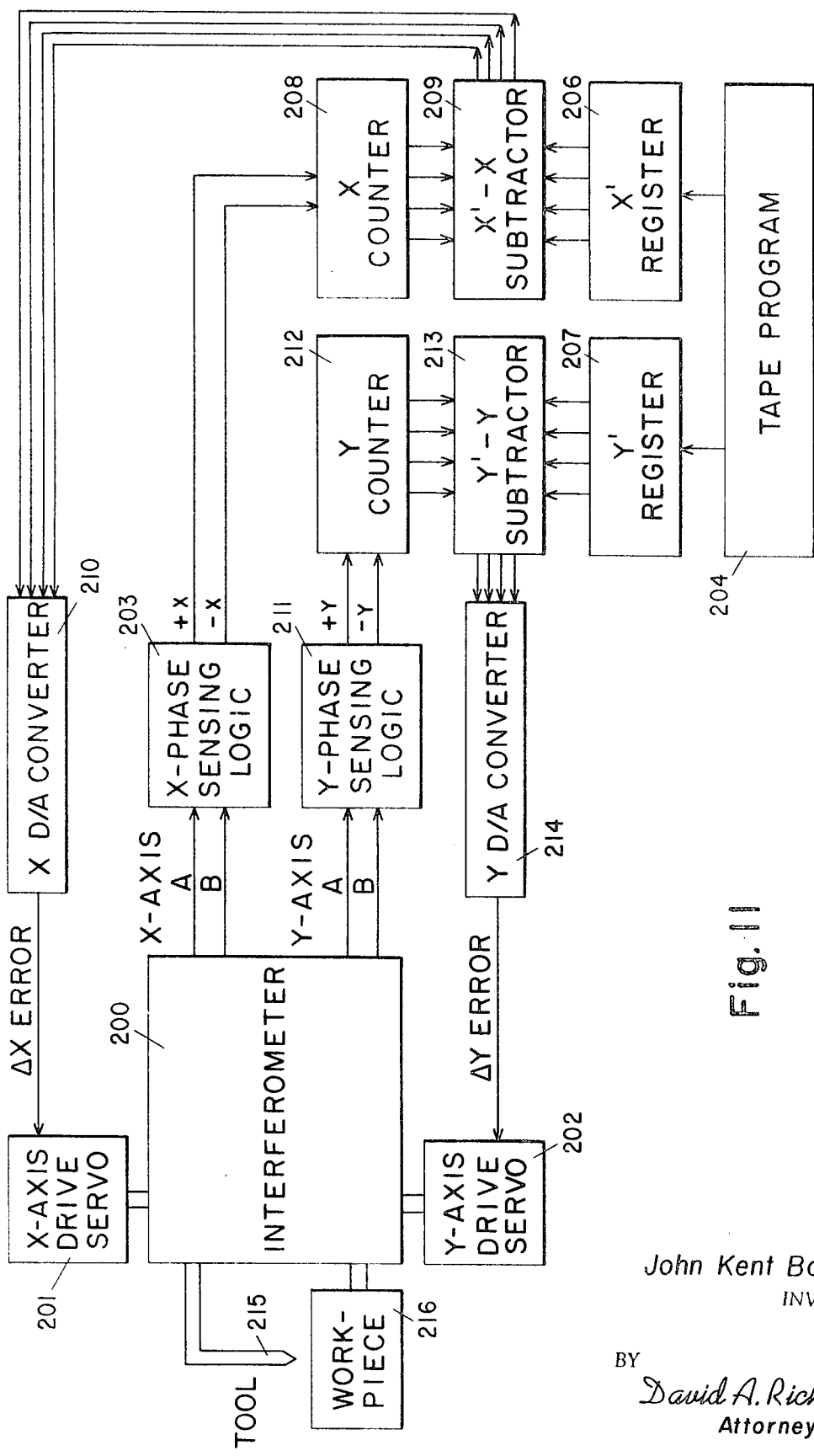
FIG. 11 is a schematic circuit block diagram illustrating a positioning apparatus embodying the invention.

Referring now to FIG. 11, there is here illustrated a positioning apparatus embodying the invention applicable, for example, for positioning a planar piece of work relative to a drill press. Here the problem is to position the work accurately with respect to the drill bit in a programmed sequence. Preprogrammed tape supplies the indicia for each hold to be drilled. In the simplest case for a single spindle the programming is straight-forward and serial. Since the XY information is applied simultaneously the drive system moves the planar work piece in both X and Y at the same time. If the piece reaches the X position coordinate first, it ceases to move in X and is simply driven along the Y axis to the desired point.

As a positioning apparatus, the stage plate becomes the workpiece and the fiducial becomes the tool. Using the two axes interferometer of FIGS. 5—10, the outputs of each axis in phase quadrature channels A and B are each applied to a phase sensing logic circuit. The logic circuit produces count pulses coupled to an "up-down" counter, for example, which produces an actual count of interference fringes indicative of the instantaneous position of a point on the workpiece relative to the tool. The pulses either add to or subtract from the count indicated. A desired location is preprogrammed and coupled to registers for each axis. The registers and the counters are coupled to a subtractor. The output of the subtractor is coupled to a digital to analogue converter which produces an error signal in each axis to drive its respective servomotor. The apparatus servos around the desired position until it comes to rest. At that time the operation is completed, preferably by moving the workpiece along the Z axis until the cut is completed.

In detail then, the interferometer 200 has an X axis drive servomotor 201 which translates the stage plate or the workpiece along an X translation axis and a Y axis drive servo motor 202 drives the work piece along the Y translation. Here the tool is fixed in position and the work piece moves. Conversely, the tool may move and the workpiece be fixed in position. Note that the fiducial can be a pair of crossed hairs in a microscope, an engraving tool, a light beam, a laser, tool bit, scribe, pen or drillpoint, etc.

The output of the interferometer are the X and Y signals from the photoelectric detectors where the phase of channel A is in quadrature with channel B for each axis. The signals are coupled to a phase sensing logic circuit 203 which determines the direction of the motion either plus or minus X. If the output indicates a positive going motion, pulses are coupled to the plus input of the X counter. Each pulse represents a detector fringe which represents one-fourth of a wavelength at the frequency of the light source. If the output of the phase sensing circuit is negative, the counts are subtracted from the cumulative total in the counter. If it is going in the plus direction, the pulses add.

This count is then compared with instructions derived from the tape programmer 204 coupled to an input register 206 for X desired position and an input register 207 for Y desired position. The X counter 208 is then coupled to a subtractor 209 which in turn is coupled to an X-axis digital-to-analog converter 210 to produce an error signal which is coupled to the X-axis drive servo motor. The workpiece or stage plate continues to move in a position or negative X direction until the error signal is reduced to O, i.e., less than a quarter wavelength, for example, 0.15 microns.

Similarly, the output of the Y-axis photoelectric detectors in the interferometer are coupled to a pair of quadrature phased channels A and B. A Y-axis phase sensing circuit 211 produces an indication of direction either plus or minus along the Y-axis. The circuit 211 is coupled to a Y-axis counter 212 which adds positive counts and subtracts negative counts.

The Y-axis counter 212 and the Y-axis register 207 are coupled to a Y-axis subtractor 213 which produces Y-axis difference signals. The difference signals are coupled to a digital-to-analogue converter 214 which is coupled to the Y-axis servomotor 202.

While relative translations between the workpiece and the tool take place in more than one direction, its application to a broad range of such tools is clear.

A milling machine, for example, requires continuous measurement of position in order to provide continuous error correction. Such a machine is schematically illustrated in FIG. 12.

Figure 12:
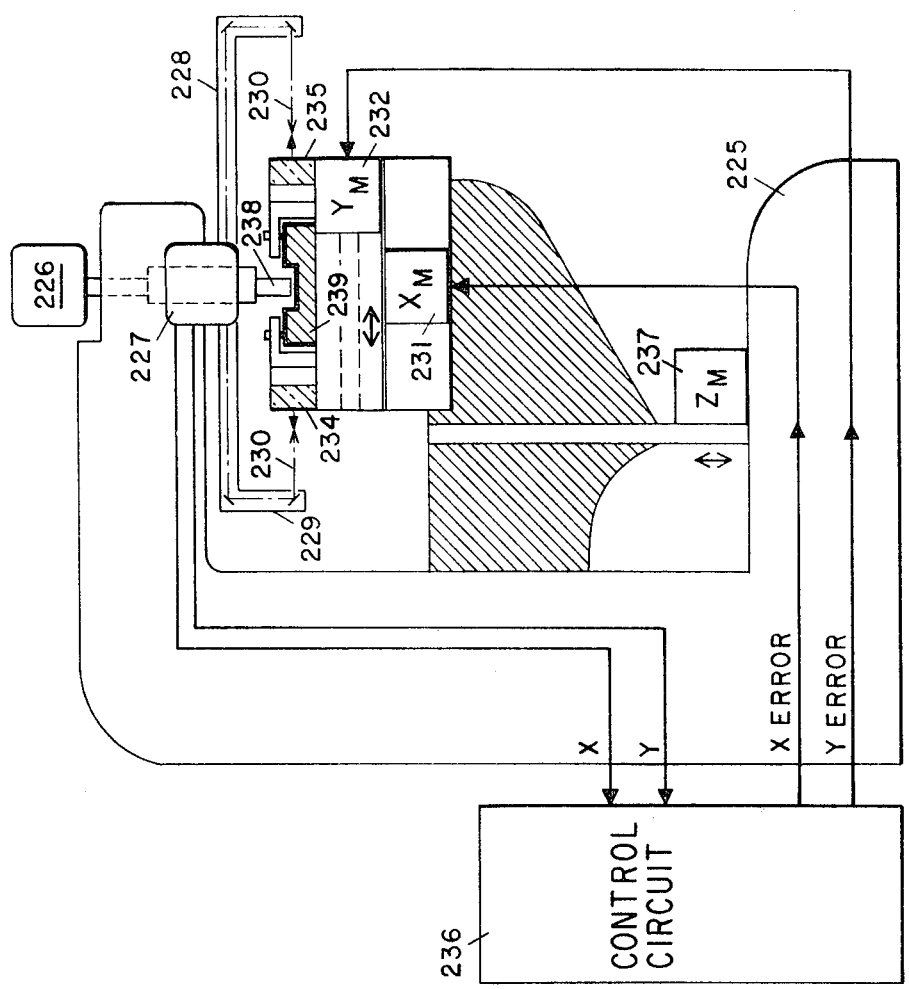
FIG. 12 is a machine tool embodying the interferometer of the invention useful in the apparatus of FIG. 12.

Referring then to FIG. 12, there is here illustrated a milling machine embodying the invention. The milling machine here is another application of the apparatus in FIG. 11.

A base yoke 225 carries a motor 226 and a spindle head 227. The spindle head carries the interferometer optical source and assembly. Extending from the spindle is shown a pair of optical arms 228 and 229 defining the Y-axis optical path 230. An X-axis motor 231 and Y-axis motor 232 drive lead screws which position a workpiece 239 clamped in a table having two pairs of mutually orthogonal reflecting surfaces. Here the Y-axis reflecting surfaces 234 and 235 are shown. The X-axis motor positions a table carrying the Y-axis motor and table along the X translation axis, into the plane of the drawing. The Y-axis motor is affixed to the X translation table and positions the Y translation table relative thereto, thereby positioning the workpiece in X and Y continuously to control the direction of the cut with great accuracy. A Z-axis motor positions the table to engage the cutter to a desired depth. The cutting end of the tool is positioned at the reference point O and is, in fact, the fiducial.

The interferometer is coupled to a control circuit where the functions described with reference to FIG. 11 are included. X and Y position signals are coupled to the circuit 236 which produces X and Y error signals coupled to the motors 231 and 232 respectively, to maintain a continuous, accurate desired cutting path.

DESCRIPTION AND EXPLANATION OF THE INTERFEROMETER IN FIG. 13

Figure 13:
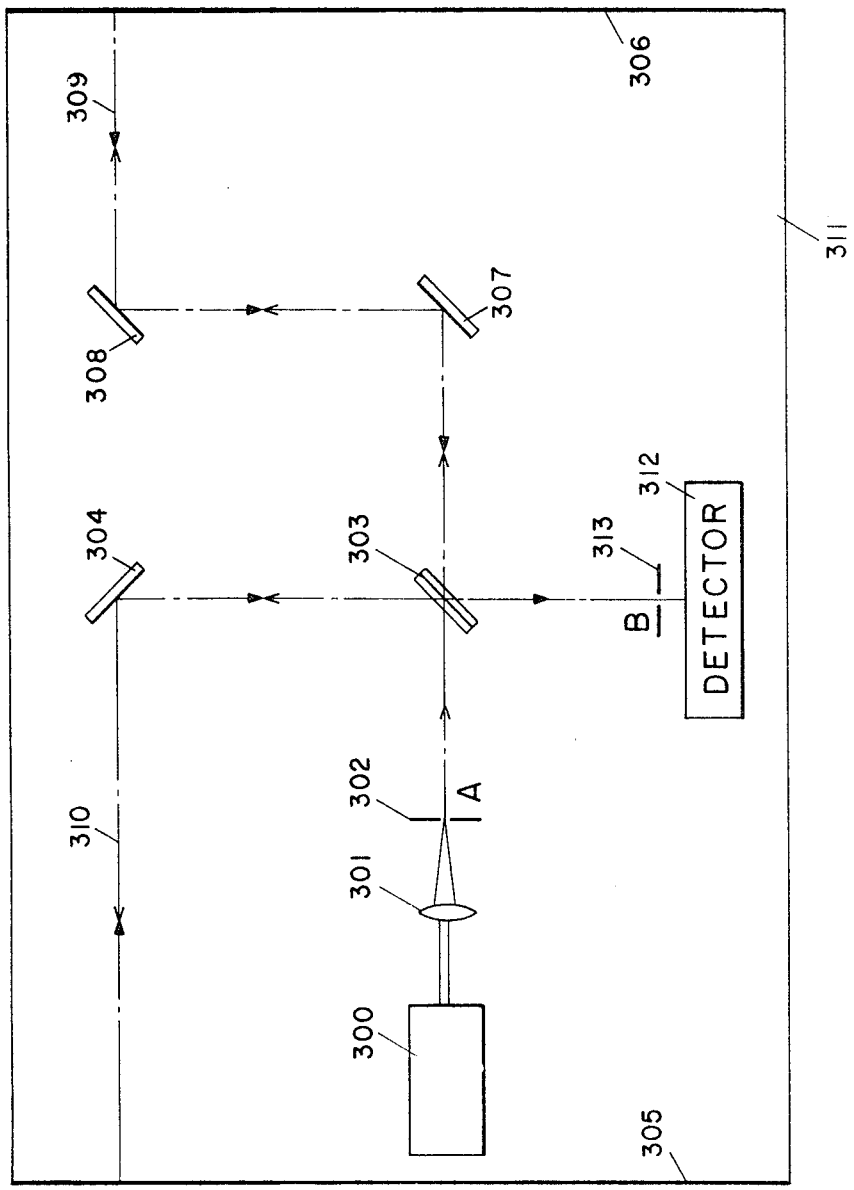
FIG. 13 is a plan view in schematic form of a modification of the interferometer in FIG. 1 illustrating a light source disposed between a pair of inwardly reflecting surfaces.

Referring now to FIG. 13, there is here illustrated a modification of the embodiment in FIG. 1.

From the analysis of FIG. 2, it is clear that the reflecting surface may be outside the sources; i.e., the light source may be located between reflecting surfaces which face each other and reflect opposing rays of light.

An interferometer is shown having a stage plate with reflecting surfaces rigidly coupled together and facing each other with the light source in between. A laser beam of monochromatic, coherent light is focused on a pinhole A in an entrance aperture plate. The spherical wavefront light produced from the pinhole is transmitted to a beam splitter. The beam splitter reflects an energy portion of a coupling mirror and one of the pair of parallel reflecting surfaces. The portion transmitted by the beam splitter is directed by coupling mirrors to an opposing path to the other reflecting surface, both paths incident upon the reflecting surfaces being colinear.

In operation, the interferometer of FIG. 13 is similar to that in FIG. 1. The fiducial is again located at the center point between the apparent optical sources.

Thus a laser 300 produces a light beam which is focused by a lens 301 on a pinhole A in plate 302. The light is transmitted to a beam splitter 303 which reflects a portion to a coupling mirror 304 and thence to the left, as shown, to a reflecting surface 305. The reflecting surface 305 is rigidly coupled to an opposing parallel reflecting surface 306, the two reflecting surfaces facing each other and reflecting light inwardly.

The light energy portion transmitted by the beam splitter 303 is directed by a pair of coupling mirrors 307 and 308 to the reflecting surface 306. The path 309 to the surface 306 and the path 310 to the surface 305 are colinear but opposing in direction. A stage plate 311 presents a rigid body with reflecting surfaces 305 and 306.

The reflected energies are directed back through the coupling mirrors backwards through the beam splitter 303 through exit pinhole B in the exit aperture plate 313 to the detector 312.

As illustrated in FIG. 13, the light source is disposed between the reflecting surfaces. The fiducial is located, in accordance with the analysis of FIG. 2, at the center point between the two apparent sources. A translation along a measurement axis in the coordinate system of the stage plate is the distance along the normal from the fiducial to the bisecting plane.

This modification of the embodiment in FIG. 1 is particularly useful for machine tool applications and other positioning and control devices because the long optical arms are not necessary. The interferometer head can be made very small and more than one interferometer head can be used to locate a number of points on the stage plate simultaneously.

The fiducial can always be determined physically, in accordance with the analysis of FIG. 2 and compensating for various phase and transmission changes which take place due to elements in the system, to within 0.001 inches. Such an error, however, produces a translation error less than $10^{16}$ inches.

The term "parallel" as used herein means that degree of parallelism consistent with the degree of accuracy required. A relatively large variation from a true parallel condition produces translation errors which are relatively negligible. For example, lack of parallelism of the order of 10 seconds of arc and, allowing 1 minute of arc tilt in the stage plate, produces a translation error of the order of a microinch or less.

It will be apparent from the foregoing description of the invention that it has broad application to the art of measurement, control and positioning. For the first time interferometers become useful in a normal industrial environment. Measuring engines embodying the invention may be used as control and positioning devices for applications involving machine tools, automated comparators, automatic stereographic plotters and printers, automatic contour plotting, automatic map production, photography and star plate measurement.

The invention has application to engraving, ruling engines, jig borers, step and repeat cameras, manufacture of integrated circuits, automatic registration and all forms of cutting, abrasing and welding.

Further, devices embodying the invention may be used for goniometry, and sensing of acceleration and other inertial conditions.

Devices embodying the invention are not limited to traditional translations in orthogonal directions. A broad range of motions tending, for example, to sweep up all points on a stage plate may be used and still provide a measurement in terms of orthogonal translation in the coordinate system of the object to be measured. Simultaneously, devices and systems embodying the invention are useful in the arts of navigation, position and attitude sensing and control.

While there has hereinbefore been presented what are at present considered to be the preferred embodiments of the invention, it will be apparent to all those of ordinary skill in the art that many and varied modifications may be made thereto without departing from the true scope and spirit of the invention.

It will be considered therefore that all such modifications and variations are indeed a part of the invention.

What I claim is:

1. A method for measuring the position of a body, having first and second reflective surfaces coupled thereto, comprising the steps of:

directing different portions of a first beam of energy at the first reflective surface with different angles of incidence relative to the first reflective surface, there being at least one portion within said beam whose angle of incidence is normal to the first reflective surface;

directing different portions of a second beam of energy, coherent with respect to said first beam, at the second reflective surface with different angles of incidence relative to the second reflective surface, there being at least one portion within said beam whose angle of incidence is normal to the second reflective surface; and measuring the difference between the lengths of corresponding portions of the paths of only those portions within the first and second beams of energy which are reflected normally from their associated reflective surfaces, said step of measuring including the steps of causing at least part of said first and second reflected beams to interfere and form an interference pattern, and detecting changes in the interference pattern caused by only said portions within the first and second beams of energy which are reflected normally from their associated reflective surfaces.

2. The method as set forth in claim 1 wherein said step of directing a first beam of energy includes the step of causing said first beam of energy to be divergent when it encounters said first reflective surface, and said step of directing a second beam of energy includes the step of causing said second beam of energy to be divergent when it encounters said second reflective surface.

3. The method as set forth in claim 2 wherein said step of causing said first beam of energy to be divergent includes the step of causing said first beam of energy to have a spherical wavefront, and said step of causing said second beam of energy to be divergent includes the step of causing said second beam of energy to have a spherical wavefront.

4. The method as set forth in claim 3 wherein said first and second beams of energy are comprised of coherent light.

5. The method as set forth in claim 4 further including the step of positioning a member in accordance with the detected changes in the interference pattern.

6. The method as set forth in claim 5 wherein said step of positioning includes the positioning of a machine tool in accordance with the detected changes in the interference pattern.

7. Interferometric mensuration apparatus for measuring displacement of a body along an axis comprising:
  a. a body located on said axis and having first and second reflecting surfaces positioned along said axis and transverse thereto, said first and second reflecting surfaces being similarly shaped geometrically;
  b. means for directing a first beam of energy at said first reflecting surface including means for causing said first beam of energy to be divergent about said axis when it encounters said surface and reflects therefrom to form a first beam of reflected energy;
  c. means for directing a second beam of energy, coherent with respect to said first beam, at said second reflecting surface including means for causing said second beam of energy to be divergent about said axis when it encounters said second reflecting surface and reflects therefrom to form a second beam of reflected energy;
  d. means for causing said first and second reflected beams of energy to interfere to form an interference pattern; and
  e. means for measuring displacement of said body along said axis including detecting means for detecting changes in the interference pattern caused by said first and second reflected beams of energy and for rendering output signals indicative thereof, said output signals being representative of displacement of said body along said axis.

8. Apparatus as set forth in claim 7 wherein said first and second reflecting surfaces are planar and substantially parallel.

9. Apparatus as set forth in claim 7 wherein said means for causing said first beam of energy to be divergent includes means for causing said first beam of energy to have a spherical wavefront when it encounters said first reflecting surface, and said means for causing said second beam of energy to be divergent includes means for causing said second beam of energy to have a spherical wavefront when it encounters said second reflecting surface.

10. Apparatus as set forth in claim 9 wherein said first and second reflecting surfaces are planar and substantially parallel.

11. Apparatus as set forth in claim 7 wherein said detecting means includes means for detecting only that portion of the interference pattern formed by substantially perpendicular reflection of said first and second reflected energy beams respectively from said first and second reflecting surfaces.

12. Apparatus as set forth in claim 11 wherein said means for causing said first beam of energy to be divergent includes means for causing said first beam of energy to have a spherical wavefront when it encounters said first reflecting surface, and said means for causing said second beam of energy to be divergent includes means for causing said second beam of energy to have a spherical wavefront when it encounters said second reflecting surface.

13. Apparatus as set forth in claim 12 wherein said first and second beams of energy are coherent light beams.

14. Apparatus as set forth in claim 13 wherein said first and second light beams emanate from a common light source.

15. Apparatus as set forth in claim 14 wherein said light beams are coherent and similarly polarized, and means are provided for varying the phase of a first polarization component of said first beam of light with respect to a second polarization component of said first beam of light, and wherein said detecting means includes first means for detecting the interference pattern formed by the first polarization components of said first and second beams, and second means for detecting the interference pattern formed by the second polarization components of said first and second beams.

16. Apparatus as set forth in claim 12 including:
   a. said body having third and fourth reflecting surfaces positioned along a second axis which is substantially perpendicular to said axis, said third and fourth reflecting surfaces being similarly shaped geometrically;
   b. means for directing a third beam of energy at said third reflecting surface including means for causing said third beam of energy to have a spherical wavefront when it encounters said surface and reflects therefrom to form a third beam of reflected energy;
   c. means for directing a fourth beam of energy at said fourth reflecting surface including means for causing said fourth beam of energy to have a spherical wavefront when it encounters said fourth reflecting surface and reflects therefrom to form a fourth beam of reflected energy;
   d. means for causing said third and fourth reflected beams of energy to interfere to form an interference pattern; and
   e. second detecting means for only detecting changes in the interference pattern formed by substantially perpendicular reflection of said third and fourth reflected beams of energy and for rendering an output signal indicative thereof, said output signal being indicative of displacement of said body along said second axis.

17. Apparatus as set forth in claim 12 wherein means are provided for positioning a member in accordance with the output signal from said detecting means.

18. Apparatus as set forth in claim 17 wherein said positioning means includes a machine tool.

19. Apparatus as set forth in claim 12 wherein said apparatus includes a stationary reticle positioned on said axis, whereby displacement of said body relative to said reticle between first and second points on said body is measured by positioning said first point at said reticle, then positioning said second point at said reticle, and said detecting means detects changes in said interference pattern caused by movement of said body relative to said reticle.

20. Apparatus as set forth in claim 19 wherein:
   a. said first and second beams of light emanate from a common light source; and
   b. said reticle is positioned on said axis at a position where said first and second beams of light would have to travel an equal distance from said common light source to arrive at said reticle.

21. Apparatus as set forth in claim 14 wherein said first and second beams of light are formed by:
   a. source means for producing one beam of light having a spherical wavefront;
   b. beam splitter means positioned adjacent said source means to split said one beam of light into said first and second light beams; and
   c. mirror means positioned to direct said first and second beams of light against said first and second reflecting surfaces.

22. Apparatus as set forth in claim 21 wherein said detecting means includes:
   a. photodetecting means positioned adjacent to said beam splitter means; and
   b. a member having a small aperture therein positioned between said photodetecting means and said beam splitter means for examining only the interference pattern formed by substantially perpendicular reflection of said first and second reflected energy beams reflected respectively from said first and second reflecting surfaces.